Dec. 23, 1947.  E. M. TUCKER  2,433,173
STEERING DEVICE FOR SNOW TRACTORS
Filed Nov. 8, 1945  2 Sheets-Sheet 1

INVENTOR.
E. M. Tucker
BY
ATTYS

Dec. 23, 1947.   E. M. TUCKER   2,433,173
STEERING DEVICE FOR SNOW TRACTORS
Filed Nov. 8, 1945   2 Sheets-Sheet 2

INVENTOR.
E. M. Tucker
BY
ATTYS

Patented Dec. 23, 1947

2,433,173

UNITED STATES PATENT OFFICE 2,433,173

STEERING DEVICE FOR SNOW TRACTORS

Emmitt M. Tucker, Grass Valley, Calif., assignor to Tucker and Sons, Grass Valley, Calif., a corporation Application November 8, 1945, Serial No. 627,305

4 Claims. (Cl. 280—11)

This invention relates to improvements in snow tractors of a character shown in Patent No. 2,341,000, dated February 8, 1944.

The object of the present invention is to provide a steering assembly for a tractor of that character which will have means for selectively mounting the front end of a tractor upon ground engaging wheels or upon snow engaging skis, and at the same time provide a common means for steering the front end of the tractor irrespective of whether it is supported on the wheels or skis.

A further object of the invention is to produce a simple and inexpensive device and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views.

Figure 1:
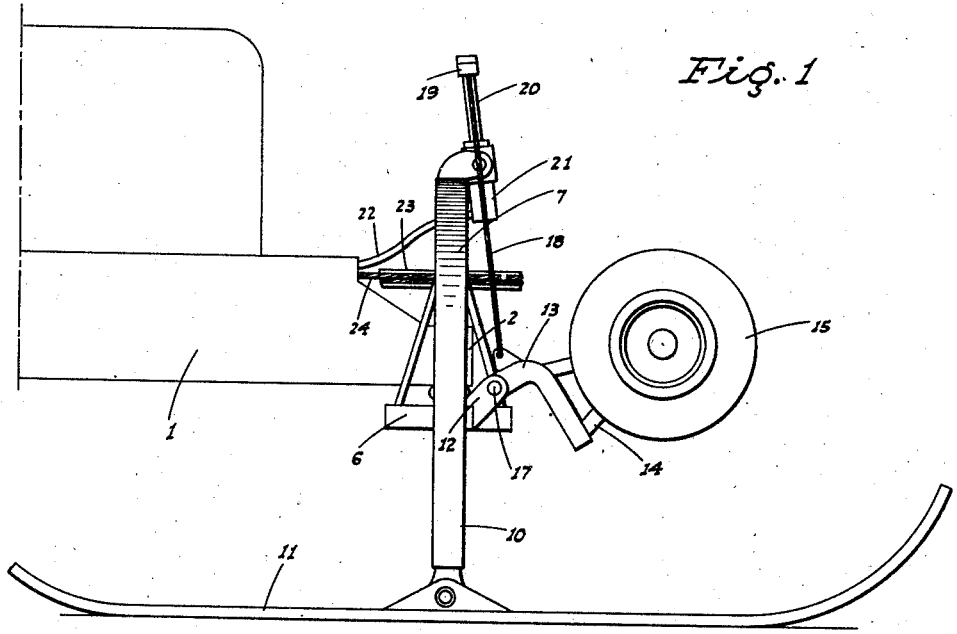
Figure 1 is a side elevation of the forward portion of a snow tractor showing my steering assembly mounted thereon when the parts are so arranged that the tractor is supported upon the skis.

Referring now more particularly to the characters of reference on the drawings, numeral 1 represents in diagrammatic outline the forward end of the tractor.

The frame of the tractor preferably tapers to a point at its extreme outer end where it is provided with a bearing 2 turnably mounted in which is a vertical king pin 3. On the lower end of the king pin is a transverse bearing hub 4. Pivotally mounted in the hub 4 is a pin 5 fixed on a horizontally disposed frame 6 which extends transversely across the front end of the tractor. On the outer ends of the frame 6 is fixed an arch frame 7 provided with a channel 8 at its inner face. The king pin 3, at its upper end, is provided with a guide lug 9 which rides in the channel 8 when the frame 6—7 swings about its pivot 5.

The arch frame 7 has arms 10 projecting below each end of the frame 6. At the lower end of each arm is pivotally mounted a ski 11 so balanced that when the frame 6—7 is raised the trailing end of the ski will drag along the ground while the front end will incline upwardly as shown in Fig. 2. On the frame 6, and spaced to each side of the king pin 3, is a pair of ears 12; between each pair of ears 12 is pivoted an L-shaped supporting bracket 13, on the outer face of each of which is a wheel supporting frame 14 journaled in the outer end of which is a wheel 15. These wheels 15 are adapted to be selectively held in raised position as shown in Fig. 1 when the tractor is to be moved over snow and at the same time the skis 11 are in contact with the snow and support the forward end of the tractor.

When the tractor is to be run over ground, the wheels may then be lowered so that the under face of the wheel supporting portion of the frame 14 underlies the frame 6. The over-all length of the frame 14 and wheel 15 is then such as to support the front end of the tractor sufficiently to lift the skis 11 off of the ground and allow them to trail as shown in Fig. 2. The wheels may be locked in this position by means of set screws 16 which are projected through the frame 6 and into the frame 14 in threaded relation to lock the two together.

Figure 2:
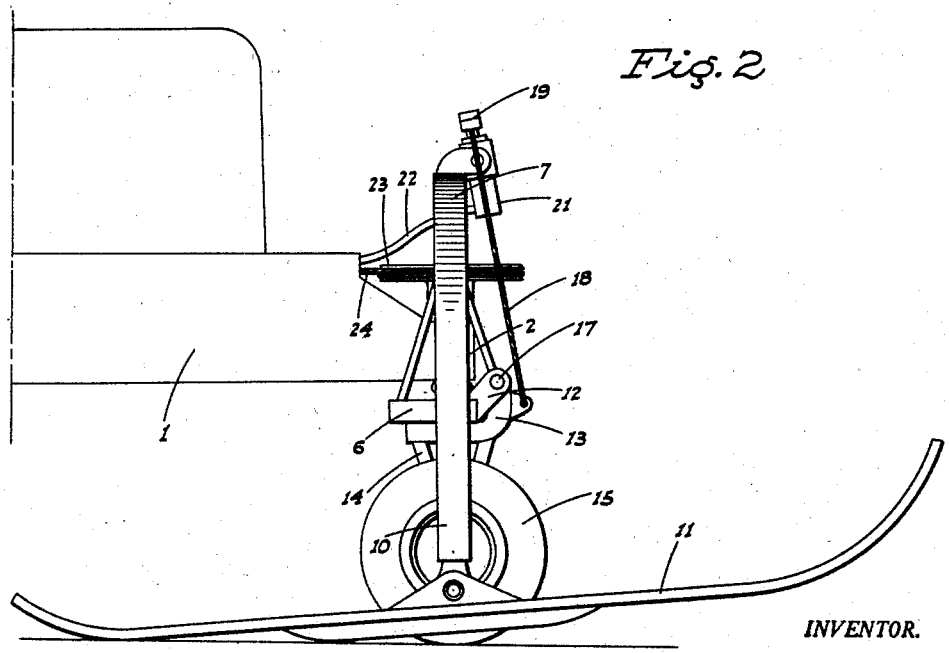
Figure 2 is a similar view, but showing the arrangement of the parts when the tractor is supported upon the wheels.
Figure 3:
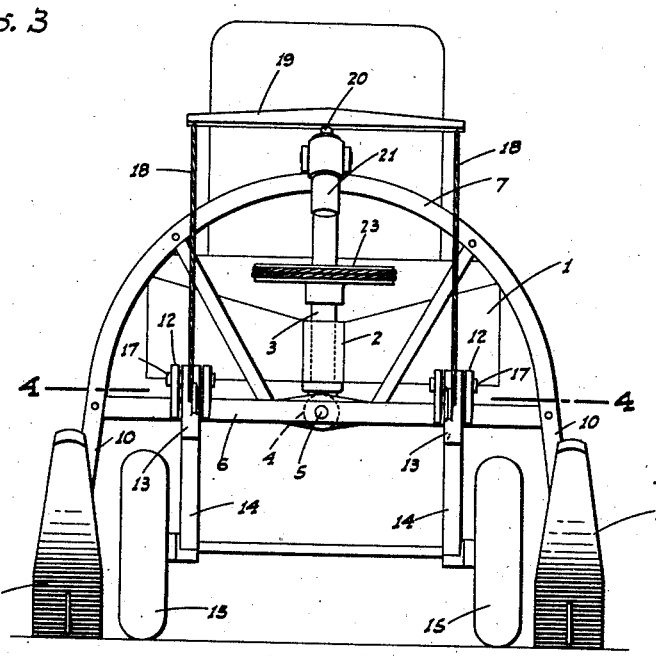
Figure 3 is a front elevation of the structure with the parts in the position shown in Fig. 2.
Figure 4:
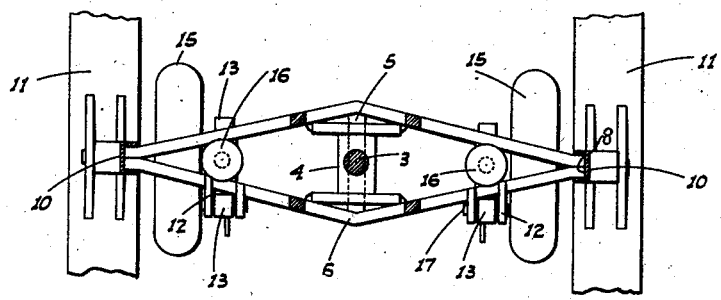
Figure 4 is a sectional view taken on a line 4—4 of Fig. 3.
Figure 6:
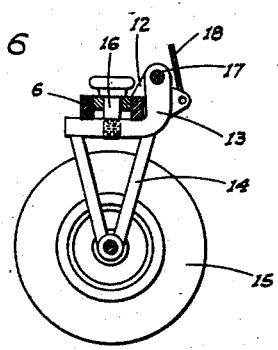
Figure 6 is a fragmentary sectional view showing a means for locking the wheels in position when they are supporting the tractor.
Figure 5:
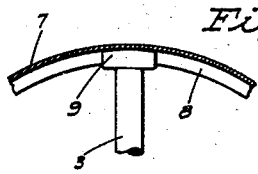
Figure 5 is a fragmentary view of the guide means.

When it is desired to raise the wheels and allow the tractor to be supported on the skis, set screws 16 are removed and the wheel frames and wheels are then swung on their respective pivots 17 through the medium of cables 18 which are connected to the frame 14 and to a cross arm 19 on the piston rod 20 of a hydraulic cylinder 21, which is pivotally mounted on the top of the arch frame 7 as shown clearly in Figs. 1 and 2. Fluid pressure, from any desired source, may be admitted to the cylinder 21 through the outlet conduit 22. Lowering of the wheels is effected by gravity upon release of the pressure in the cylinder 21.

From the foregoing description it will readily be seen that the tractor may be selectively supported on the skis or on the wheels. When supported on either the skis or the wheels, the entire assembly may be steered to the right or to the left through the medium of a steering drum 233 fixed to the king pin 3 and operable through a cable 24 leading to any desired point of operation on the tractor.

It will also be obvious that lateral tilting of the steering assembly may be permitted when either the skis or the wheels are supporting the tractor through the common pivot point 5, which supports the frame carrying both the wheels and skis. When such tilting action takes place it is guided and held rigid not only by the hub 4 on the king pin, but also by the guide lug 9 moving through the channel 8.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A steering assembly for tractors comprising the combination with a tractor of a vertical king pin pivoted at the front end of the tractor, a frame disposed transversely of the king pin and pivoted relative thereto for oscillating movement in a vertical plane, an arm depending from each end of the frame, a ski pivoted to the lower end of each arm, wheel carrying frames pivoted to the first named frame, means for selectively holding the wheels raised out of contact with the ground or allowing them to drop to ground engaging position, the overall length of the wheel frames and wheels being such that when in ground engaging position the wheels support the front end of the tractor and the skis hang free on the arms.

2. A device as in claim 1 including means for securing the wheel frames in lowered position.

3. A device as in claim 1 in which the wheel holding means comprises a hydraulic cylinder supported above the first named frame, a cross arm on the piston rod of the cylinder and cables interposed between the cross arm and the wheel frames.

4. A steering assembly for tractors comprising the combination with a tractor of a vertical king pin pivoted at the front end of the tractor, a frame disposed transversely of the king pin and pivoted relative thereto for oscillating movement in a vertical plane, skis supported by the frame, wheels supported by the frame, means to selectively place the skis or wheels into engagement with the ground whereby to support the front end of the tractor either on the skis or the wheels, respectively, an arch frame connected to the first named frame, and a guide lug on the king pin guided along the arch frame.

EMMITT M. TUCKER.

REFERENCES CITED

The following references are of record in the file of this patent:

UNITED STATES PATENTS

| Number | Name | Date |
|---|---|---|
| 766,290 | Shephard | Aug. 2, 1904 |
| 1,052,059 | Huss | Feb. 4, 1913 |
| 1,280,845 | Rieff | Oct. 8, 1918 |
| 2,331,561 | Marr | Oct. 12, 1943 |
| 431,508 | Clouse | July 1, 1890 |

FOREIGN PATENTS

| Number | Country | Date |
|---|---|---|
| 140,399 | Great Britain | Oct. 14, 1920 |